United States Patent
Chong et al.

(10) Patent No.: US 11,454,125 B1
(45) Date of Patent: Sep. 27, 2022

(54) AIRFOIL WITH DIRECTIONAL DIFFUSION REGION

(71) Applicant: DOOSAN HEAVY INDUSTRIES & CONSTRUCTION CO., LTD., Changwon-si (KR)

(72) Inventors: Gene Chong, Jupiter, FL (US); Andres Jaramillo, Jupiter, FL (US); Kibaek Kim, Changwon (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 0 days.

(21) Appl. No.: 17/378,893

(22) Filed: Jul. 19, 2021

(51) Int. Cl.
*F01D 5/18* (2006.01)

(52) U.S. Cl.
CPC ............. *F01D 5/187* (2013.01); *F01D 5/186* (2013.01); *F01D 5/185* (2013.01); *F05D 2240/304* (2013.01); *F05D 2240/305* (2013.01); *F05D 2260/202* (2013.01)

(58) Field of Classification Search
CPC .... F01D 5/187; F01D 5/186; F05D 2260/202; F05D 2240/304; F05D 2240/305
See application file for complete search history.

(56) References Cited

U.S. PATENT DOCUMENTS

| | | | |
|---|---|---|---|
| 5,368,441 A | 11/1994 | Sylvestro et al. | |
| 6,179,565 B1* | 1/2001 | Palumbo | F01D 5/187 415/115 |
| 7,806,659 B1* | 10/2010 | Liang | F01D 5/187 415/115 |

* cited by examiner

*Primary Examiner* — Eldon T Brockman
(74) *Attorney, Agent, or Firm* — Shook, Hardy & Bacon, L.L.P.

(57) ABSTRACT

A turbine blade for a gas turbine engine. The turbine blade includes a cooling path for a coolant, routing the coolant through an internal cooling cavity and out through a plurality of cooling holes formed proximate a trailing edge of the turbine blade. Each of the cooling holes including a diffusing region designed so that a coolant does not separate from a radially inward sidewall of the diffusing region.

19 Claims, 5 Drawing Sheets

AIRFOIL WITH DIRECTIONAL DIFFUSION REGION

TECHNICAL FIELD

The present invention generally relates to a turbine blade for a gas turbine engine.

BACKGROUND

Gas turbine engines, such as those used for power generation or propulsion, include at least a compressor section, a combustor section and a turbine section. The turbine section includes a plurality of blades that extend away from, and are radially spaced around, an outer circumferential surface of a number of rotor discs. Typically, adjacent each plurality of blades is a plurality of nozzles. The plurality of nozzles usually extend from, and are radially spaced around, a shroud assembly.

The turbine components are subjected to mechanical and thermal stresses that cause inefficiencies and part degradation. It is an on-going goal to reduce the thermal stresses on the turbine components to allow the turbine components to better withstand the operating environment. One method for reducing the thermal stresses of the turbine components is to move a coolant, such as air, through an internal cooling cavity in the turbine components. As the coolant moves through the internal cavity of the airfoil it cools the exposed surfaces within the internal cavity through convection. While these existing cooling methods are somewhat effective, it would be desirable to add cooling capacity to the airfoils to further, or more effectively, reduce the thermal load on the airfoil. In addition, increased cooling capacity allows the turbine to operate at higher temperatures, which results in additional power generation by the hot gas flow.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes a turbine blade that has an airfoil. The airfoil includes a unique cooling path for a coolant, which in aspects routes the coolant through a cooling cavity, through a plurality of radially spaced flow dividers proximate a trailing edge of the airfoil. The radially spaced flow dividers produce an increase in film cooling coverage and reduces cooling flow separation. In some aspects, the radially spaced flow dividers are formed through a cut back machining process. In other aspects, the radially spaced flow dividers are formed during a casting process. The radially spaced flow dividers include a diffuser region that may be formed through the machining process and/or the casting process. The diffuser region includes a bias such that openings through which the coolant exits the airfoil are skewed to open towards the blade tip. Further, by providing a diffuser region favoring the radial direction of the turbine, coolant flow separation from the flow dividers is minimized and the cooling effectiveness is thereby increased. The increased cooling capacity allows the turbine to operate at higher temperatures, which results in additional power generation.

BRIEF DESCRIPTION OF THE DRAWINGS

The embodiments disclosed herein relate to compressor component airfoil designs and are described in detail with reference to the attached drawing figures, which illustrate non-limiting examples of the disclosed subject matter, wherein:

FIG. 4 depicts a rear detail view of the trailing edge of the turbine blade of FIG. 1, in accordance with aspects hereof;

DETAILED DESCRIPTION

The subject matter of this disclosure is described herein to meet statutory requirements. However, this description is not intended to limit the scope of the invention. Rather, the claimed subject matter may be embodied in other ways, to include different steps, combinations of steps, features, and/or combinations of features, similar to those described in this disclosure, and in conjunction with other present or future technologies.

In brief, and at a high level, this disclosure describes a turbine blade that has an airfoil. The airfoil includes a unique cooling path for a coolant, which in aspects routes the coolant through a cooling cavity, through a plurality of radially spaced flow dividers proximate a trailing edge of the airfoil. The radially spaced flow dividers produce an increase in film cooling coverage and reduces cooling flow separation. In some aspects, the radially spaced flow dividers are formed through a cut back machining process. In other aspects, the radially spaced flow dividers are formed during a casting process. The radially spaced flow dividers include a diffuser region that may be formed through the machining process and/or the casting process. The diffuser region includes a bias such that openings through which the coolant exits the airfoil are skewed to open towards the blade tip. Further, by providing a diffuser region favoring the radial direction of the turbine, coolant flow separation from the flow dividers is minimized and the cooling effectiveness is thereby increased. The increased cooling capacity allows the turbine to operate at higher temperatures, which results in additional power generation.

As used herein, the term "proximate" refers to a location of two or more objects being closely related in space. The terms "axial" and "axially" refer to directions and orientations extending substantially parallel to a longitudinal axis of a rotary machine. The terms "radial" and "radially" refer to directions and orientations extending substantially perpendicular to the longitudinal axis of the rotary machine.

Figure 1:
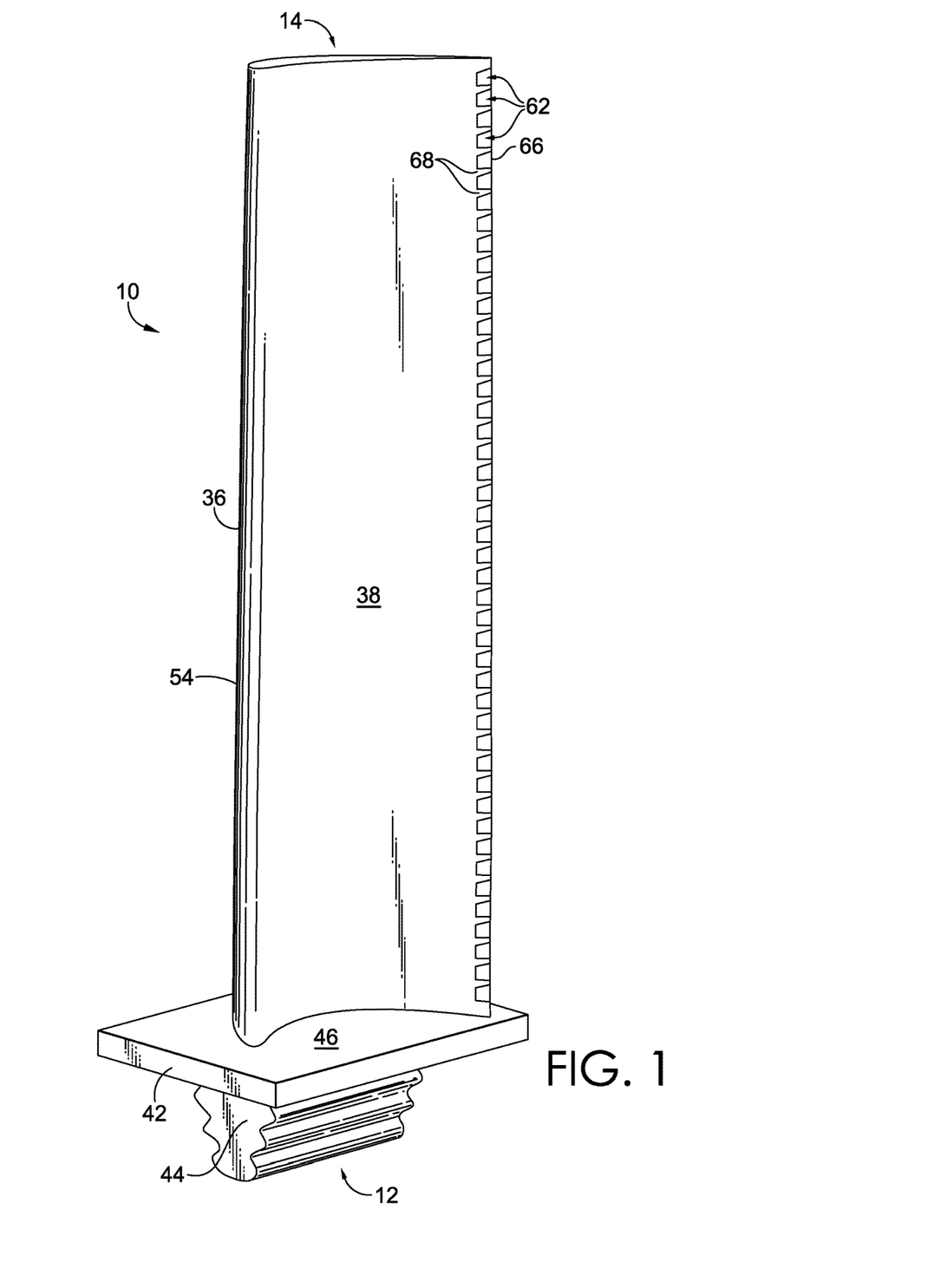
FIG. 1 depicts a perspective view of a turbine blade for a gas turbine engine, in accordance with aspects hereof.

Referring now to FIG. 1, there is illustrated a perspective view of one aspect of a turbine blade 10. The turbine blade 10 is shown having an airfoil 38, a platform 42, and a root portion 44. The root portion 44 is configured to be coupled with a rotor disc of a turbine (e.g., a turbine of an axial-flow gas turbine engine). The root portion extends from a radially proximal end 12 (relative to the rotor disc when coupled thereto) to the platform 42. The airfoil 38 extends in a radial direction from the platform 46 to a distal end 14 (i.e. the blade tip) of the turbine blade 10, the distal end 14 of the turbine blade 10 being opposite the proximal end 12 of the turbine blade 10. In some aspects, the blade tip 14 may include a tip cavity recessed below the distal end 16. The airfoil 38 includes a leading edge 54, a trailing edge 62, and a pressure sidewall 56 and suction sidewall 58 each extending between and joined to the other at the leading edge 54 and the trailing edge 66. The pressure sidewall 56 has a concave shape and the suction sidewall 58 has a convex shape.

In the illustrated aspect, a plurality of cooling holes 62 are formed through the airfoil 38 proximate the trailing edge 66. In some aspects, the cooling holes 62 are formed through the pressure sidewall 56. In other aspects, the cooling holes 62 are formed through the suction sidewall. In further aspects, the cooling holes 62 may be formed in part through the pressure sidewall 56 and in part through the suction sidewall 58.

Figure 2A:
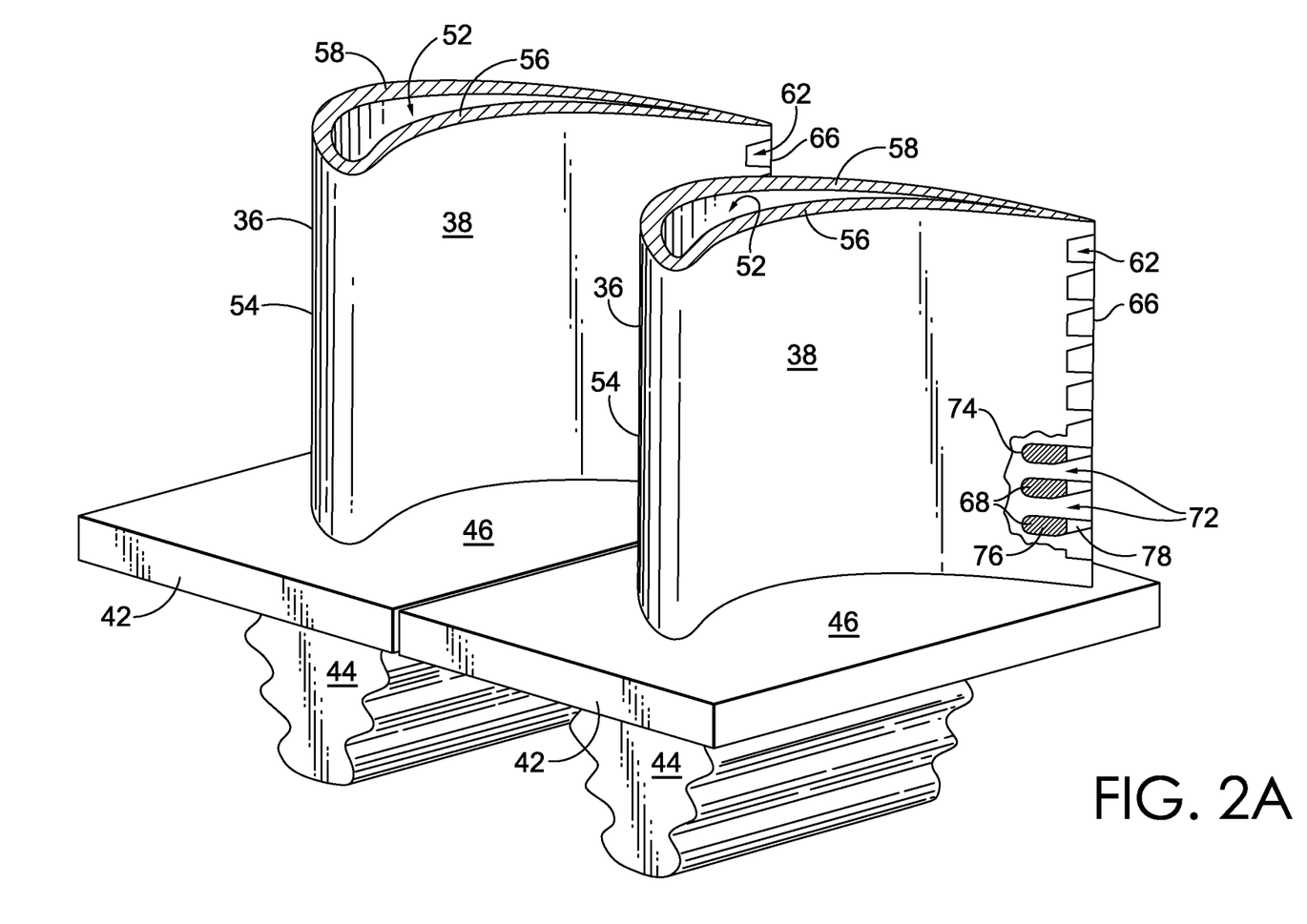
FIG. 2 depicts a perspective view of portions of a pressure side of a turbine blade, in accordance with aspects hereof.
Figure 2B:
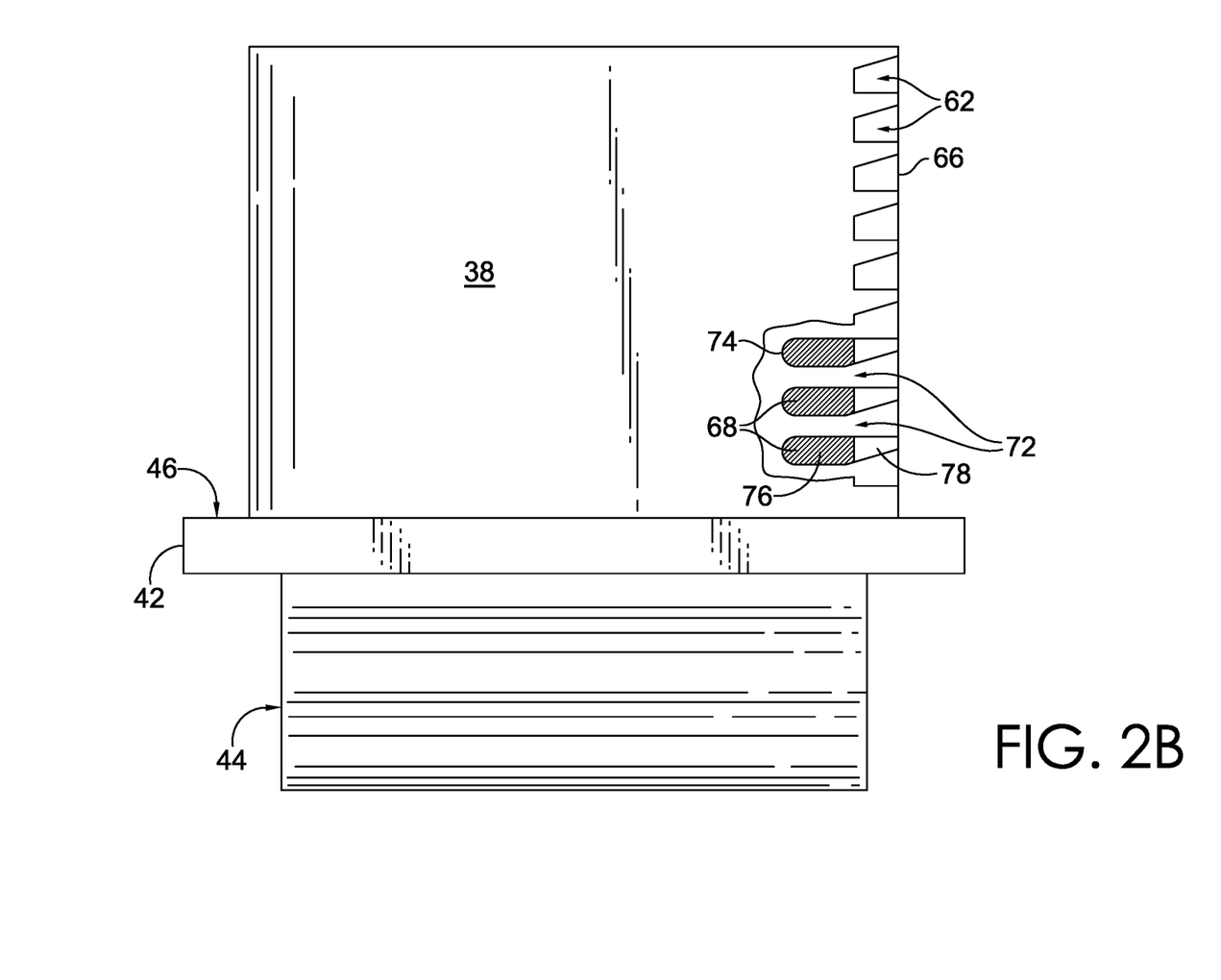

As seen in FIG. 2, each stage of the turbine may include an annular array of turbine blades 10, which may be circumferentially spaced around and coupled to a rotor disc via respective root portions 44. Adjacent turbine blades 10 each have platforms 42 aligned to define a radially inner hot gas surface 46. The hot gas flow path interacts with the airfoils 38 of each of the turbine blades 10 to drive the rotor disc and a shaft coupled thereto.

An internal cooling cavity 52 may be formed in the turbine blade 10. Coolant may be supplied in through the root portion 44, to the cooling cavity 52, and out through one or more cooling holes formed in the turbine blade 10. The one or more cooling holes may be formed through different portions of the airfoil 38 (e.g., proximate the leading edge, proximate the trailing edge, at the blade tip, etc.) and be in communication with the cooling cavity 52. For example, the plurality of cooling holes ## are in communication with the cooling cavity 52.

The illustrated airfoil 38 is hollow, with the suction sidewall 58 and the pressure sidewall 56 defining the cooling cavity 52. In other aspects, the cooling cavity 52 may comprise a serpentine circuit extending through the airfoil 38. In further aspects, more than one cooling cavity is formed between the pressure sidewall 56 and the suction sidewall 58.

In order to increase the cooling provided to the airfoil 38 proximate the trailing edge, a plurality of radially spaced flow dividers 68 are formed within the cooling cavity 52 proximate the trailing edge. In some aspects, the radially spaced flow dividers 68 are formed when the turbine blade 10 is cast. For example, the turbine blade 10 may be cast around a ceramic core that includes fingers that extend towards a trailing edge side of the mold in which the turbine blade is being cast. When the ceramic core is removed (e.g., through submersion in an alkaline bath, etc.), one of the radially spaced flow dividers 68 is positioned between each cooling hole of the plurality of cooling holes. In other aspects, the airfoil 38 is cast without any cooling holes formed proximate the trailing edge 66. In these aspects, the plurality of cooling holes 62 may be formed through a machining process (e.g., ECM).

The plurality of radially spaced flow dividers 68 extend laterally between the pressure wall 56 and the suction wall 58. Cooling passages 72 are spaced between adjacent flow dividers 68 and provide a path for coolant to flow from the internal cooling cavity 52 out of the airfoil 38 proximate the trailing edge 62. Coolant flowing through the cooling passages 72 cools the airfoil 38 proximate the trailing edge 62 through convection. Wherein the coolant generally flows within the internal cavity 52 in a radial direction. Upon entering the cooling passages 72 the coolant generally flows normal to the radial direction.

The flow dividers 68 may have an arcuate shaped leading edge 74 that may help divert coolant around and into one of the adjacent cooling passages 72. The leading edge 74 may also be any other shape so as to enhance the flow of coolant from the coolant cavity 52 to the cooling passages 72. The flow dividers 68 comprise a constant thickness portion 76 and an axially converging portion 78. The constant thickness portion 76 extending from the leading edge 74 to the portion of the flow divider which begins to converge. The converging portion 78 extending from the end of the constant thickness portion to the trailing edge 62.

Figure 3A:
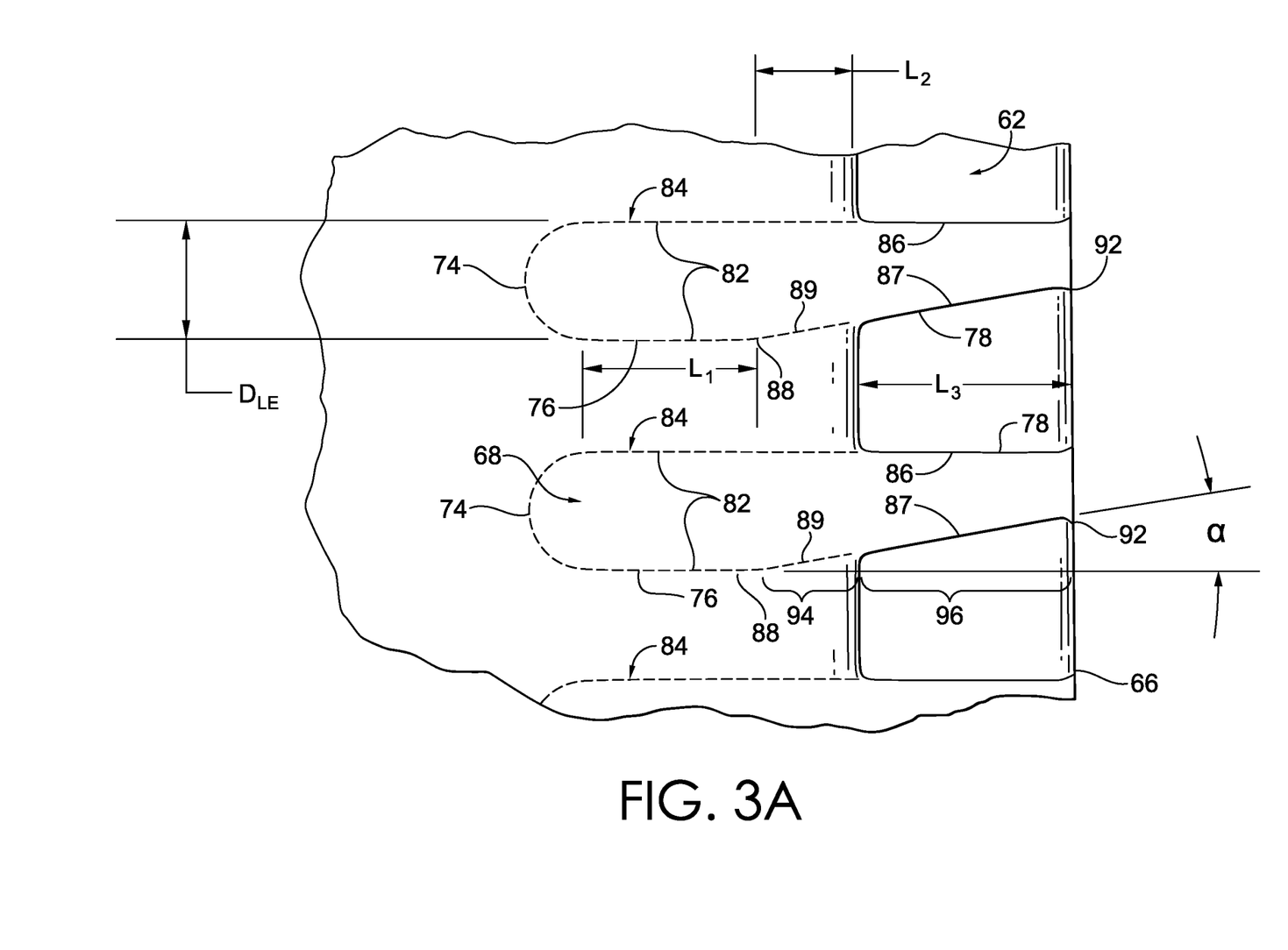
FIG. 3 depicts a detail view of a trailing edge of the turbine blade of FIG. 1, in accordance with aspects hereof.
Figure 3B:
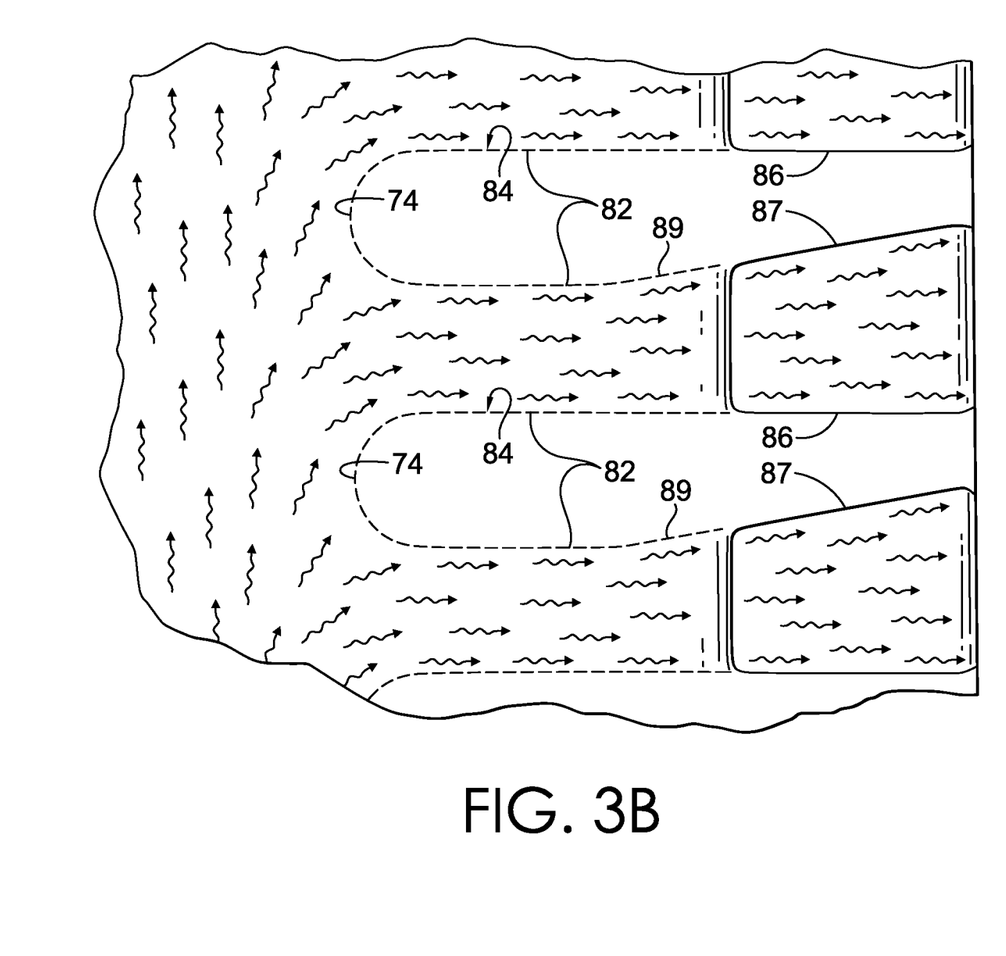

Turning now to FIG. 3 which depicts a detail view of the trailing edge of the airfoil portion 38 of the turbine blade 10 as shown in FIG. 1. The constant thickness portion 76 of the dividers comprises a pair of sidewalls 82 which are parallel and equally spaced from each other. This space between the adjacent sidewalls 84 is a constant width and has a length $L_1$ and has a constant cross-sectional area along the entire length $L_1$.

The converging portion 78 of the flow dividers 68 extends from the downstream point 88 to a point of termination 92, which in aspects may be at the trailing edge 62. The converging portion 78 comprises two converging sidewalls, parallel sidewall 86, an uncovered converging sidewall 87, and a covered converging sidewall 89. Parallel sidewall 86 being parallel with the pair of sidewalls 82 which make up the constant thickness portion 76. The pair of sidewalls 82 and the parallel sidewall being normal to the radial direction. Converging sidewall 87 positioned such as to create a diffuser region that skews radially outward from a turbine centerline. More specifically, converging sidewall 87 extends at an angle $\alpha$ from sidewall 82 of the constant thickness portion 76.

The sidewalls 86 and 87 of adjacent dividers form a covered diffusing region 94 and an uncovered diffusing region 96. The covered diffusing region being defined by the suction sidewall, the pressure sidewall, the parallel sidewall 86 and the converging sidewall 87. The covered diffusion region having a length L2. The uncovered diffusing region 96 being defined by the parallel sidewall 86, converging sidewall 87 and the suction wall. The uncovered diffusion region having a length L3. Additionally as can be seen in FIG. 4, the diffusing regions have a height, H and a width, W.

As can be seen in FIGS. 3 and 4, the diffusing region only expand radially outward along the turbine blade 10. In contrast, prior art cooling holes included diffusing regions that expanded both radially outward and radially inward. Typically, prior art cooling holes were symmetrical. In operation, the prior art turbine blades suffered from a separation of the coolant from the surface of the diffusing region. The portion of the diffusing region where separation occurred was not cooled by the coolant which resulted in exposure to the hot gas and a shortened life cycle for the turbine blade. The separation occurred on the radially inward side of the prior art cooling holes.

In contrast, the present invention addresses the shortcomings of the prior art by changing the shape of the diffusing region. The shape discussed above eliminates separation of the coolant from the radially inward sidewall (i.e., parallel sidewall 86). Therefore, convective cooling of all sidewalls of the diffusing region is maintained, which increases the efficiency of cooling and the life cycle of the turbine blade 10.

Embodiment 1. An airfoil comprising: a suction sidewall extending from a leading edge to a trailing edge; a pressure sidewall extending from the leading edge to the trailing edge and joined to the suction sidewall at the leading edge and the trailing edge, the suction sidewall and the pressure sidewall defining a cooling cavity therebetween; a first flow divider positioned proximate the trailing edge and within the cooling cavity, the first flow divider extending from the suction sidewall to the pressure sidewall; the first flow divider comprising a leading wall, a first wall extending from the leading wall to the trailing edge, and a second wall extending from the leading wall to the trailing edge opposite the first wall; and the first wall having a parallel portion and a converging portion, the parallel portion of the first wall being parallel with the second wall, the converging portion of the first wall converging towards the second wall, the converging portion positioned between the parallel portion and the trailing edge.

Embodiment 2. The airfoil of embodiment 1 further comprising: a second flow divider positioned proximate the trailing edge and within the cooling cavity, the second flow divider extending from the suction sidewall to the pressure sidewall; the second flow divider comprising a second leading wall, a third wall extending from the second leading wall to the trailing edge, and a fourth wall extending from the second leading wall to the trailing edge opposite the third wall; and the third wall having a parallel portion and a converging portion, the parallel portion of the third wall being parallel with the fourth wall, the converging portion of the third wall converging towards the fourth wall, the converging portion positioned between the parallel portion and the trailing edge, wherein the first wall faces the fourth wall to define a passageway for communicating coolant from within the cooling cavity out of the airfoil.

Embodiment 3. The airfoil of embodiment 2, wherein a cross-sectional area of the passageway is constant along a length of the parallel portion of the first wall.

Embodiment 4. The airfoil of embodiment 2, wherein a cross-sectional area of the passageway increases along the length of the converging portion of the first wall from a smallest cross-sectional area at an intersection between the parallel portion and the converging portion to a largest cross-sectional area at the trailing edge.

Embodiment 5. The airfoil of embodiment 2, wherein the passageway terminates at a cooling hole.

Embodiment 6. The airfoil of embodiment 5, wherein the cooling hole is oriented in a same direction as a direction the airfoil rotates.

Embodiment 7. The airfoil of embodiment 6 further comprising a plurality of additional flow dividers defining a plurality of additional passageways in communication with a plurality of additional cooling holes.

Embodiment 8. The airfoil of embodiment 7, wherein the first flow divider, the second flow divider, and the plurality of additional flow dividers are radially spaced proximately along the trailing edge.

Embodiment 9. A turbine blade comprising: a suction sidewall extending from a leading edge to a trailing edge; a pressure sidewall extending from the leading edge to the trailing edge and joined to the suction sidewall at the leading edge and the trailing edge, the suction sidewall and the pressure sidewall defining a cooling cavity therebetween; a first flow divider positioned proximate the trailing edge and within the cooling cavity, the first flow divider extending from the suction sidewall to the pressure sidewall, the first flow divider having a first leading wall positioned opposite the trailing edge, the first flow divider having a first parallel wall extending from the first leading wall to the trailing edge in a first direction; and a second flow divider positioned proximate the trailing edge and within the cooling cavity, the second flow divider extending from the suction sidewall to the pressure sidewall, the second flow divider having a second leading wall positioned opposite the trailing edge, the second flow divider having a second parallel wall extending from the second leading wall to a diverging wall in the first direction and in parallel with the first parallel wall, the diverging wall extending from the second parallel wall to the trailing edge in a second direction away from the first parallel wall.

Embodiment 10. The turbine blade of embodiment 9 further comprising: a root portion; a platform; and a blade tip, wherein the pressure sidewall and the suction sidewall extend from the platform to the blade tip.

Embodiment 11. The turbine blade of embodiment 10, wherein the root portion is coupled a coolant source and includes a cooling circuit for communicating a coolant to the cooling cavity.

Embodiment 12. The turbine blade of embodiment 9, wherein the first flow divider and the second flow divider define a passageway for communicating coolant from the cooling cavity to an exterior of the turbine blade.

Embodiment 13. The turbine blade of embodiment 12, wherein the passageway comprises a directional diffuser oriented in a same direction as a direction the turbine blade rotates.

Embodiment 14. The turbine blade of embodiment 9, wherein the first direction is set at an angle to the trailing edge.

Embodiment 15. The turbine blade of embodiment 9, wherein the second direction is perpendicular to the trailing edge.

Embodiment 16. The turbine blade of embodiment 9, wherein the first leading wall has an arcuate shape configured for directing coolant around the first flow divider and into a passageway on either side of the first flow divider.

Embodiment 17. The turbine blade of embodiment 9, wherein the diverging wall at the trailing edge is radially outward of the diverging wall at the second parallel wall.

Embodiment 18. A method of manufacturing a turbine blade having directional diffusing cooling holes, the method comprising: forming an airfoil portion of the turbine blade, wherein the airfoil portion comprises: a suction sidewall extending from a leading edge to a trailing edge; a pressure sidewall extending from the leading edge to the trailing edge and joined to the suction sidewall at the leading edge and the trailing edge, the suction sidewall and the pressure sidewall defining a cooling cavity therebetween; a plurality of cooling holes formed in the pressure sidewall, the plurality of cooling holes being radially aligned proximate the trailing edge; a plurality of flow dividers extending from the pressure sidewall to the suction sidewall, the plurality of flow dividers being radially aligned proximate the trailing edge in alternating arrangement with the plurality of cooling holes such that each cooling hole opens to a passageway defined between adjacent flow dividers; each passageway defined by a first boundary wall associated with a first flow divider and a second boundary wall associated with a second flow divider, the first boundary wall extends in parallel to the trailing edge in a first direction, the second boundary wall has a parallel portion that extends in the first direction and parallel with the first boundary wall and a diverging portion that extends from the parallel portion to the trailing edge and away from the first boundary wall; and removing a portion of the pressure sidewall adjacent at which the plurality of cooling holes are formed.

Embodiment 19. The method of embodiment 18, wherein removing a portion of the pressure sidewall comprises making a back cut on the pressure sidewall at the trailing edge.

Embodiment 20. The method of embodiment 18, wherein the diverging portion of the second boundary wall extends radially outward while approaching the trailing edge.

Embodiment 21. Any of the aforementioned embodiments 1-20, in any combination.

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations of elements, as well as use of elements not shown, are also possible and contemplated.

What is claimed is:

1. An airfoil comprising:
    a suction sidewall extending from a leading edge to a trailing edge;
    a pressure sidewall extending from the leading edge to the trailing edge and joined to the suction sidewall at the leading edge and the trailing edge, the suction sidewall and the pressure sidewall defining a cooling cavity therebetween;
    a first flow divider positioned proximate the trailing edge and within the cooling cavity, the first flow divider extending from the suction sidewall to the pressure sidewall;
    the first flow divider comprising a leading wall, a first wall extending from the leading wall to the trailing edge, and a second wall extending from the leading wall to the trailing edge opposite the first wall;
    the first wall having a parallel portion and a converging portion, the parallel portion of the first wall being parallel with the second wall, the converging portion of the first wall converging towards the second wall, the converging portion positioned between the parallel portion and the trailing edge;
    a second flow divider positioned proximate the trailing edge and within the cooling cavity, the second flow divider extending from the suction sidewall to the pressure sidewall;
    the second flow divider comprising a second leading wall, a third wall extending from the second leading wall to the trailing edge, and a fourth wall extending from the second leading wall to the trailing edge opposite the third wall; and
    the third wall having a parallel portion and a converging portion, the parallel portion of the third wall being parallel with the fourth wall, the converging portion of the third wall converging towards the fourth wall, the converging portion positioned between the parallel portion and the trailing edge,
    wherein the first wall faces the fourth wall to define a passageway for communicating coolant from within the cooling cavity out of the airfoil.

2. The airfoil of claim 1, wherein a cross-sectional area of the passageway is constant along a length of the parallel portion of the first wall.

3. The airfoil of claim 1, wherein a cross-sectional area of the passageway increases along the length of the converging portion of the first wall from a smallest cross-sectional area at an intersection between the parallel portion and the converging portion to a largest cross-sectional area at the trailing edge.

4. The airfoil of claim 1, wherein the passageway terminates at a cooling hole.

5. The airfoil of claim 4, wherein the cooling hole is oriented in a same direction as a direction the airfoil rotates.

6. The airfoil of 5 further comprising a plurality of additional flow dividers defining a plurality of additional passageways in communication with a plurality of additional cooling holes.

7. The airfoil of claim 6, wherein the first flow divider, the second flow divider, and the plurality of additional flow dividers are radially spaced proximately along the trailing edge.

8. A turbine blade comprising:
    a suction sidewall extending from a leading edge to a trailing edge;
    a pressure sidewall extending from the leading edge to the trailing edge and joined to the suction sidewall at the leading edge and the trailing edge, the suction sidewall and the pressure sidewall defining a cooling cavity therebetween;
    a first flow divider positioned proximate the trailing edge and within the cooling cavity, the first flow divider extending from the suction sidewall to the pressure sidewall, the first flow divider having a first leading wall positioned opposite the trailing edge, the first flow divider having a first parallel wall extending from the first leading wall to the trailing edge in a first direction; and
    a second flow divider positioned proximate the trailing edge and within the cooling cavity, the second flow divider extending from the suction sidewall to the pressure sidewall, the second flow divider having a second leading wall positioned opposite the trailing edge, the second flow divider having a second parallel wall extending from the second leading wall to a diverging wall in the first direction and in parallel with the first parallel wall, the diverging wall extending from the second parallel wall to the trailing edge in a second direction away from the first parallel wall.

9. The turbine blade of claim 8 further comprising:
    a root portion;
    a platform; and
    a blade tip, wherein the pressure sidewall and the suction sidewall extend from the platform to the blade tip.

10. The turbine blade of claim 9, wherein the root portion is coupled a coolant source and includes a cooling circuit for communicating a coolant to the cooling cavity.

11. The turbine blade of claim 8, wherein the first flow divider and the second flow divider define a passageway for communicating coolant from the cooling cavity to an exterior of the turbine blade.

12. The turbine blade of claim 11, wherein the passageway comprises a directional diffuser oriented in a same direction as a direction the turbine blade rotates.

13. The turbine blade of claim 8, wherein the first direction is set at an angle to the trailing edge.

14. The turbine blade of claim 8, wherein the second direction is perpendicular to the trailing edge.

15. The turbine blade of claim 8, wherein the first leading wall has an arcuate shape configured for directing coolant around the first flow divider and into a passageway on either side of the first flow divider.

16. The turbine blade of claim 8, wherein the diverging wall at the trailing edge is radially outward of the diverging wall at the second parallel wall.

17. A method of manufacturing a turbine blade having directional diffusing cooling holes, the method comprising:

forming an airfoil portion of the turbine blade, wherein the airfoil portion comprises:

a suction sidewall extending from a leading edge to a trailing edge;

a pressure sidewall extending from the leading edge to the trailing edge and joined to the suction sidewall at the leading edge and the trailing edge, the suction sidewall and the pressure sidewall defining a cooling cavity therebetween;

a plurality of cooling holes formed in the pressure sidewall, the plurality of cooling holes being radially aligned proximate the trailing edge;

a plurality of flow dividers extending from the pressure sidewall to the suction sidewall, the plurality of flow dividers being radially aligned proximate the trailing edge in alternating arrangement with the plurality of cooling holes such that each cooling hole opens to a passageway defined between adjacent flow dividers; each passageway defined by a first boundary wall associated with a first flow divider and a second boundary wall associated with a second flow divider, the first boundary wall extends in parallel to the trailing edge in a first direction, the second boundary wall has a parallel portion that extends in the first direction and parallel with the first boundary wall and a diverging portion that extends from the parallel portion to the trailing edge and away from the first boundary wall; and removing a portion of the pressure sidewall adjacent at which the plurality of cooling holes are formed.

18. The method of claim 17, wherein removing a portion of the pressure sidewall comprises making a back cut on the pressure sidewall at the trailing edge.

19. The method of claim 17, wherein the diverging portion of the second boundary wall extends radially outward while approaching the trailing edge.

* * * * *